United States Patent
Biskup et al.

(10) Patent No.: US 9,444,125 B2
(45) Date of Patent: Sep. 13, 2016

(54) BATTERY PACK WITH NON-CONDUCTIVE STRUCTURAL SUPPORT

(71) Applicant: Atieva, Inc., Redwood City, CA (US)

(72) Inventors: Richard J. Biskup, Sunnyvale, CA (US); Chuan Chung Lin, Taipei (TW)

(73) Assignee: ATIEVA, INC., Menlo Park, CA (US)

( * ) Notice: Subject to any disclaimer, the term of this patent is extended or adjusted under 35 U.S.C. 154(b) by 209 days.

(21) Appl. No.: 14/331,300

(22) Filed: Jul. 15, 2014

(65) Prior Publication Data

US 2016/0020497 A1  Jan. 21, 2016

(51) Int. Cl.
*H01M 10/6551* (2014.01)
*H01M 10/6556* (2014.01)
*H01M 10/625* (2014.01)

(52) U.S. Cl.
CPC ....... *H01M 10/625* (2015.04); *H01M 10/6551* (2015.04); *H01M 10/6556* (2015.04); *H01M 2220/20* (2013.01)

(58) Field of Classification Search
CPC ........... H01M 10/625; H01M 10/655; H01M 10/6551; H01M 10/6556
See application file for complete search history.

(56) References Cited

U.S. PATENT DOCUMENTS

2003/0118826 A1* 6/2003 Greinke et al. ............... 428/408
2006/0105245 A1* 5/2006 Ikuta et al. ................... 429/246
2010/0104936 A1* 4/2010 Meintschel et al. .......... 429/120
2011/0192564 A1* 8/2011 Mommer et al. ............... 165/10
2013/0337310 A1* 12/2013 Omura et al. ................ 429/120

FOREIGN PATENT DOCUMENTS

WO    WO 2012/117681    *  9/2012

OTHER PUBLICATIONS

Characteristics of Kyocera Technical Ceramics, Kyocera Corporation, 2015.*

* cited by examiner

*Primary Examiner* — Anca Eoff
(74) *Attorney, Agent, or Firm* — Patent Law Office of David G. Beck

(57) ABSTRACT

A battery pack is provided that is configured to minimize the risk of battery shorts during a thermal runaway event. The battery pack uses a layer of a thermally conductive, electrically non-conducting epoxy to transfer heat from each of the pack's batteries to an underlying heat sink/heat spreader. A plurality of electrically non-conductive granules, for example fabricated from alumina or silica, is dispersed throughout at least a region of the epoxy layer. As a result of the granules, even if the epoxy layer softens sufficiently during a thermal runaway event to allow movement of the batteries, the granules will prevent the batteries from contacting the underlying heat sink/heat spreaders and shorting out, one benefit of which is decreasing the likelihood of an initial thermal runaway event propagating throughout the entire battery pack.

47 Claims, 4 Drawing Sheets

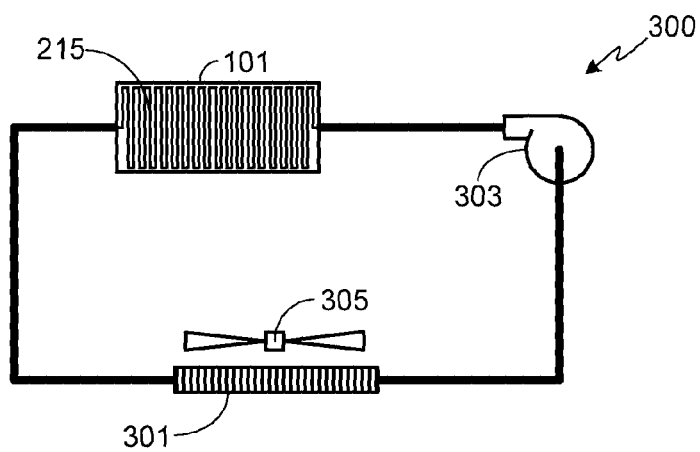
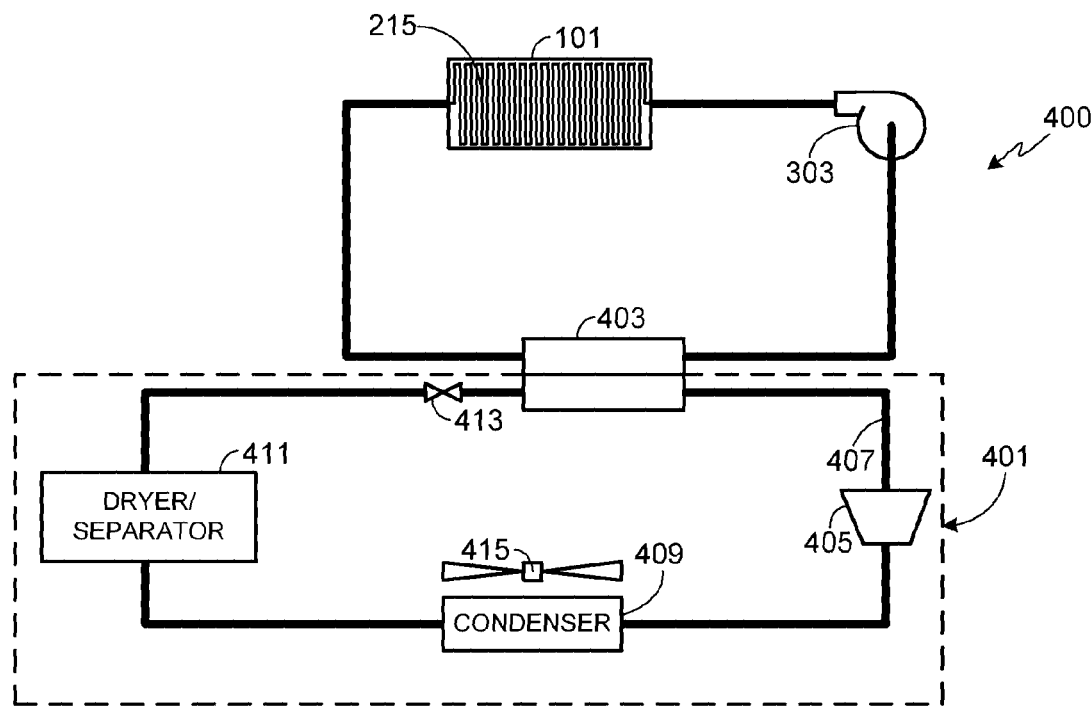
FIG. 3
FIG. 4

BATTERY PACK WITH NON-CONDUCTIVE STRUCTURAL SUPPORT

FIELD OF THE INVENTION

The present invention relates generally to batteries and battery packs and, more particularly, to a technique system and system for minimizing battery shorts within a battery pack during a thermal runaway event.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, contained within a laptop computer or utilized in a vehicle, catching on fire. As a result, one of the primary issues impacting consumer confidence with respect to both hybrid and all-electric vehicles is the risk of a battery pack fire.

Rechargeable batteries tend to be relatively unstable and prone to thermal runaway, an event that occurs when a battery's internal reaction rate increases to such an extent that it is generating more heat than can be withdrawn. Thermal runaway may be the result of a battery short, a manufacturing defect, improper cell use, or damage such as that which may be sustained during an accident or when road debris dents or punctures the battery pack. If the reaction rate and the generation of heat go unabated during the thermal runaway event, eventually the generated heat becomes great enough to cause the battery and materials in proximity to the battery to combust. Therefore when the battery undergoing thermal runaway is located within a battery pack containing tens or hundreds of batteries, a single event can quickly propagate throughout the pack, dramatically increasing the likelihood of property damage as well as the risk to people in close proximity to the vehicle.

Vehicle manufacturers have employed a variety of techniques to both minimize the risk of a battery undergoing thermal runaway and control the propagation of the event if one should occur. These techniques include ballistic shields to prevent battery pack damage from road debris, monitors that detect battery malfunctions, monitors that detect the onset of a thermal runaway event, and advanced thermal management and fire control systems that help to limit event propagation. While these techniques may reduce the likelihood of a thermal runaway event and limit its effects when one does occur, until improvements in batteries and battery chemistries completely eliminate such events, additional systems are required that can be used to further minimize the risk to people and property alike. The present invention provides such a system.

SUMMARY OF THE INVENTION

The present invention provides a battery pack that is designed to minimize the risk of battery shorts during a thermal runaway event, thereby lowering the risk of the initial thermal runaway event from propagating throughout the battery pack. The battery pack includes (i) a battery pack enclosure configured to house a plurality of batteries; (ii) a heat sink/heat spreader fabricated from a thermally and electrically conductive material that is thermally coupled to at least a subset of the plurality of batteries and to a thermal management system; (iii) a layer of thermally conductive and electrically insulative epoxy that contacts and is thermally coupled to a lower portion of each of the subset of batteries, where a region of the thermally conductive epoxy layer is interposed between a lower surface of each battery of the subset of batteries and an upper surface of the heat sink/heat spreader; and (iv) a plurality of granules dispersed throughout the region of the epoxy layer, where the granules have a melting point that is higher than the melting point of the thermally conductive epoxy.

The epoxy comprising the layer of thermally conductive epoxy preferably has a thermal conductivity of at least 0.75 $Wm^{-1}K^{-1}$, a resistivity of at least $10^{12}$ ohm–cm, and a maximum operating temperature of at least 100° C.

The granules, which may be fabricated from alumina or silica or a similar material, are preferably comprised of a material with a thermal conductivity of at least 0.75 $Wm^{-1}K^{-1}$, a resistivity of at least $10^{12}$ ohm–cm, and a melting point of at least 1000° C.; more preferably comprised of a material with a thermal conductivity of at least 1.0 $Wm^{-1}K^{-1}$, a resistivity of at least $10^{12}$ ohm–cm, and a melting point of at least 1500° C.; and still more preferably comprised of a material with a thermal conductivity of at least 20.0 $Wm^{-1}K^{-1}$, a resistivity of at least $10^{14}$ ohm–cm, and a melting point of at least 2000° C. Preferably the average diameter of the granules is within the range of 0.5 millimeters to 1.0 millimeter; alternately, in the range of 0.25 millimeters to 0.75 millimeter. The granules may be spherically shaped. The granules may be dispersed, uniformly or non-uniformly, throughout the entire layer of thermally conductive epoxy. The granules, which may be dispersed throughout the region of the thermally conductive epoxy layer in accordance with a preset dispersal pattern, may be comprised of a plurality of nubs consisting of thermally conductive epoxy and a portion of the granules.

The heat sink/heat spreader preferably has a flat upper surface, and preferably is comprised of a material, such as a metal, with a thermal conductivity of at least 100 $Wm^{-1}K^{-1}$.

The battery pack may further include (i) a mounting tray configured to hold the plurality of batteries within a preset arrangement and (ii) at least one cooling conduit coupled to the thermal management system and in thermal communication with the heat sink/heat spreader, where the cooling conduit includes at least one coolant channel containing a coolant.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 3 illustrates an exemplary cooling system suitable for use with the battery pack of the invention;

FIG. 4 illustrates an alternate exemplary cooling system suitable for use with the battery pack of the invention;

DESCRIPTION OF THE SPECIFIC EMBODIMENTS

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "battery pack" and "battery pack enclosure" may be used interchangeably and refer to an enclosure containing one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
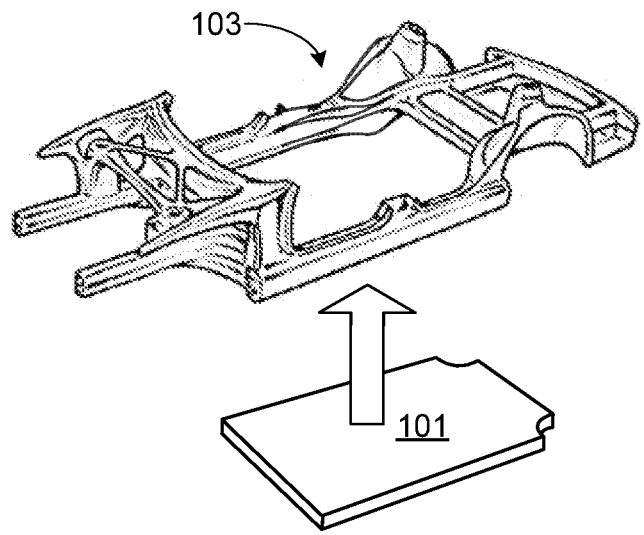
FIG. 1 provides a perspective view of a battery pack and the vehicle chassis to which it is to be mounted.

FIG. 1 provides a perspective view of a battery pack 101 configured to be mounted under vehicle chassis 103. It should be understood that the present invention is not limited to a specific battery pack mounting scheme, battery pack size, or battery pack configuration.

Figure 2:
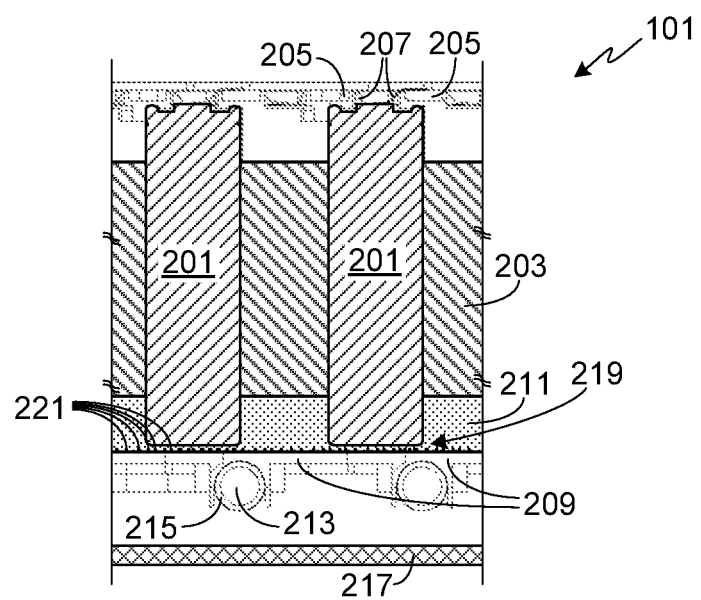
FIG. 2 provides a cross-sectional view of a portion of the battery pack shown in FIG. 1.

FIG. 2 provides a cross-sectional view of a portion of battery pack 101. Battery pack 101 includes a plurality of batteries 201 contained within a mounting tray 203. Batteries 201 are preferably cylindrical batteries, for example batteries utilizing an 18650 form-factor, and are positioned within the battery pack so that the cylindrical axis of each cell is substantially perpendicular to the upper and lower battery pack enclosure panels. Mounting tray 203 is preferably fabricated from plastic or other electrically insulating material. If mounting tray 203 is fabricated from an electrically conductive material, the batteries or the tray can include an electrically non-conductive sleeve that prevents the batteries from being shorted out by the tray.

In the illustrated configuration, access to both the positive and negative terminals is at one end of the batteries, preferably the top end of the batteries, where bus bars 205 are coupled to the positive and negative terminals of the batteries 201 using wires 207. One of the benefits of this approach is that the wires are shorter in length than any of the battery cells. Additionally, by locating all of the bus bars at one end of the battery pack, efficient heat removal can be used with the other end of the battery pack. For example, in the illustrated and preferred embodiment, the lower portion of each battery 201 is thermally coupled to a heat sink/heat spreader 209 using a layer of thermally conductive epoxy 211, where the epoxy preferably has a thermal conductivity of at least 0.75 $Wm^{-1}K^{-1}$ and where the heat sink/heat spreader preferably has a thermal conductivity of at least 100 $Wm^{-1}K^{-1}$. It will be appreciated that heat withdrawal from batteries 201 is enhanced by thermally coupling the lower portion of each battery 201 to the heat sink/heat spreaders 209 via thermally conductive epoxy 211 as shown, rather than simply interposing a layer of epoxy 211 in the gap 219 between the bottom surface of each battery and the heat sink/heat spreaders 209. Preferably gap 219 is on the order of 1 millimeter.

Epoxy layer 211, which is in contact with multiple batteries 201 as well as heat sink/heat spreaders 209, must be comprised of an electrically non-conductive material, preferably with a resistivity of at least $10^{12}$ ohm-cm, in order to prevent the batteries from shorting out. Note that in this embodiment, heat is withdrawn from the heat sink/heat spreaders 209 via a heat transfer liquid 213 contained in deformable cooling conduits tubes 215. As shown, in the preferred embodiment cooling conduits 215 are aligned with lower panel 217, resulting in the coolant within channels 209 flowing in a direction substantially perpendicular to the axes of the cylindrical batteries. By regulating the flow of coolant 213 within conduits 215 and/or regulating the transfer of heat from the coolant to another temperature control system, the temperature of cells 201 may be regulated so that the cells remain within their preferred operating range.

Figure 5:
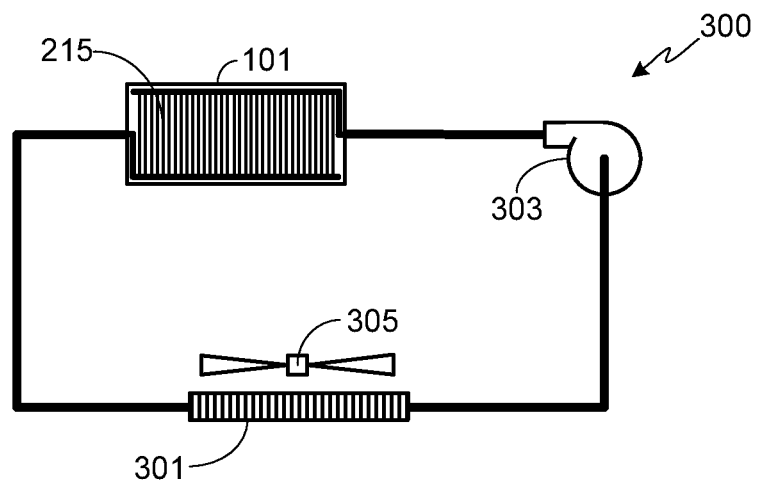
FIG. 5 illustrates the exemplary cooling system shown in FIG. 3 with a different coolant conduit configuration within the battery pack.

FIGS. 3 and 4 illustrate exemplary cooling systems that may be coupled to cooling conduits 215. In system 300 shown in FIG. 3, the coolant 213 within conduits 215 is pumped through a radiator 301 using a pump 303. A blower fan 305 may be used to force air through radiator 301 to insure cooling when the car is stationary. In system 400 shown in FIG. 4, the coolant 213 within conduits 215 is coupled to a thermal management system 401 via a heat exchanger 403. Preferably thermal management system 401 is a refrigeration system and as such, includes a compressor 405 to compress the low temperature vapor in refrigerant line 407 into a high temperature vapor and a condenser 409 in which a portion of the captured heat is dissipated. After passing through condenser 409, the refrigerant changes phases from vapor to liquid, the liquid remaining at a temperature below the saturation temperature at the prevailing pressure. The refrigerant then passes through a dryer 411 that removes moisture from the condensed refrigerant. After dryer 411, refrigerant line 407 is coupled to heat exchanger 403 via thermal expansion valve 413 which controls the flow rate of refrigerant into heat exchanger 403. Additionally, in the illustrated system a blower fan 415 is used in conjunction with condenser 409 to improve system efficiency. It should be understood that battery pack coolant conduits 215 may be coupled to other cooling/thermal management systems, and the cooling systems shown in FIGS. 3 and 4 are only meant to illustrate some common configurations for use with the conduits of the invention. Additionally, the geometry of cooling conduits 215 shown in FIGS. 3 and 4 is only meant to illustrate one possible configuration. For example, FIG. 5 shows the cooling system of FIG. 3 with a different conduit configuration within battery pack 101, one utilizing coolant manifolds. The invention is clearly not dependent upon the type of cooling system used with battery pack 101.

Under normal battery pack operation, thermally conductive and electrically non-conductive epoxy layer 211 transfers heat from the batteries 201 to the heat sink/heat spreaders 209. Additionally epoxy layer 211 prevents the batteries from directly contacting the heat sink/heat spreaders 209 by providing an electrically insulating layer between the batteries and the heat sink/heat spreaders. While many epoxies are able to withstand the normal operating temperature range of battery pack 101, some epoxies fail under the excessive temperatures that are often reached when a battery undergoes thermal runaway. For example, many epoxies only have an operating temperature range of up to 100° C. or up to 150° C. If epoxy layer 211 fails during a thermal runaway event, the epoxy layer may no longer prevent the batteries from contacting the heat sink/heat spreaders 209. Since heat sink/heat spreaders 209 are typically fabricated from an electrically conductive material (e.g., metal), when batteries 201 contact the electrically conductive heat sink/heat spreaders 209, battery shorting is likely to occur. Battery shorting can lead to a variety of issues that can impact vehicle operation, driver/passenger safety, etc. For example, battery shorting may lead to more batteries entering into thermal runaway. Therefore a single thermal runaway event can easily propagate throughout the entire battery pack, significantly increasing the level of property damage and the risk of injury to both the vehicle's occupants as well as nearby bystanders.

In accordance with the invention, in order to minimize the risk of battery shorting during a thermal runaway event, embedded within epoxy layer 211 is a plurality of granules 221, where the material comprising granules 221 is electrically non-conductive and selected to withstand the expected temperatures associated with a thermal runaway event. As a result of granules 221, even if epoxy layer 211 softens sufficiently during a thermal runaway event to allow movement of batteries 201, the granules will prevent the batteries from contacting the heat sink/heat spreaders 209.

The size of granules 221 is selected to insure that even if epoxy layer 211 is sufficiently fluid to allow movement of batteries 201, the batteries will not be able to short against heat sink/heat spreaders 209. Therefore the minimum size used for granules 221 is the minimum allowable separation distance between batteries 201 and the heat sink/heat spreaders 209. For example, in one embodiment the average size of granules 221 is in the range of 0.5 millimeters to 1.0 millimeter. In another embodiment the range of average granule size is from 0.25 millimeters to 0.75 millimeters. It will be appreciated that the selection of granule size is based on the desired minimum allowable distance between the batteries 201 and the heat sink/heat spreaders 209 and that the invention is not limited to a particular size, or a particular range of sizes, for granules 221. Additionally, the invention is not limited to a particular granule shape, although spherical granules are preferred.

As described above, granules 221 are fabricated from a material that is electrically non-conductive and has a sufficiently high melting point to withstand the expected temperatures associated with a thermal runaway event. Preferably the material comprising granules 221 is also thermally conductive, thereby insuring that the inclusion of granules 221 within epoxy layer 211 does not adversely affect the ability of layer 211 to transfer heat from batteries 201 to heat sink/heat spreaders 209. Depending upon the material selected for granules 221, in some cases the inclusion of granules 221 within epoxy layer 211 may improve the thermal conductivity of layer 201. It will be appreciated that not every material that may have the desired electrical and thermal conductivity properties is generally available in the requisite sizes and at a price point appropriate for use in mass-produced battery packs. Accordingly, in the preferred embodiment granules 221 are fabricated from alumina ($Al_2O_3$), a material that is electrically non-conductive, thermally conductive and readily available in the appropriate sizes as either rough or spherical particles. Given that the high thermal conductivity of alumina, on the order of 30 $Wm^{-1}K^{-1}$, is higher than most epoxies suitable for use as layer 211, the inclusion of alumina granules within layer 211 will increase the thermal conductivity of this layer, an added benefit to the use of this material. In an alternate preferred embodiment, granules 221 are fabricated from silica ($SiO_2$). While silica granules accomplish the goal of maintaining battery/heat sink separation during a thermal event, the lower thermal conductivity of this material as compared to that of alumina, i.e., 1.3 $Wm^{-1}K^{-1}$ as compared to 30 $Wm^{-1}K^{-1}$, may not provide the added benefit of improving the thermal conductivity of layer 211. It will be understood that granules 221 may be fabricated from materials other than alumina or silica, as long as the selected material meets the requisite material properties outlined above. For example, preferably the material comprising granules 221 has a thermal conductivity of at least 0.75 $Wm^{-1}K^{-1}$, a resistivity of at least $10^{12}$ ohm–cm, and a melting point of at least 1000° C.; more preferably comprised of a material with a thermal conductivity of at least 1.0 $Wm^{-1}K^{-1}$, a resistivity of at least $10^{12}$ ohm–cm, and a melting point of at least 1500° C.; and still more preferably comprised of a material with a thermal conductivity of at least 20.0 $Wm^{-1}K^{-1}$, a resistivity of at least $10^{14}$ ohm–cm, and a melting point of at least 2000° C.

Figure 6:
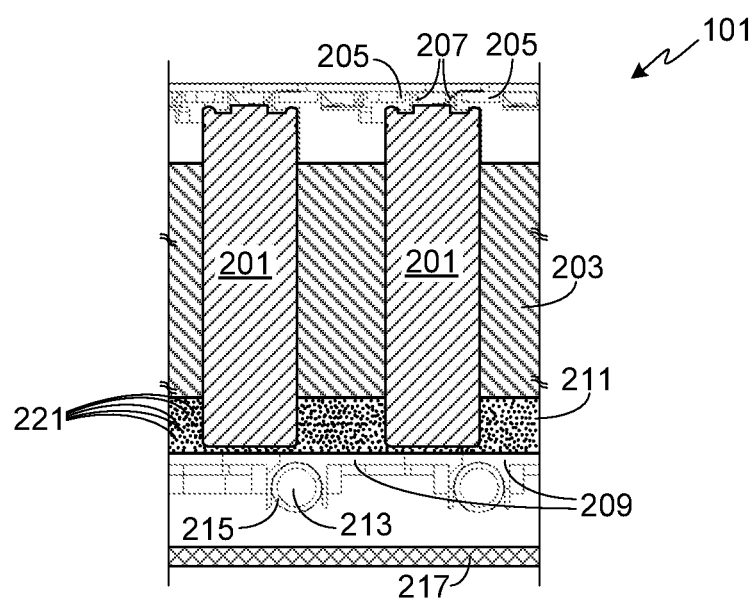
FIG. 6 provides a cross-sectional view of the same portion of the battery pack shown in FIG. 2, but in which the electrically non-conductive granules are distributed throughout the epoxy layer.

As illustrated in FIG. 2, granules 221 may be added as a layer, at least a portion of which is interposed between the bottom surface of each of the batteries 201 within pack 101 and the heat sink/heat spreaders 209. Alternately, granules 221 may be blended into the epoxy so that when it is applied to the battery pack, the granules are distributed (preferably uniformly distributed) throughout the epoxy as illustrated in FIG. 6. If granules 221 have a high thermal conductivity, for example as noted above for alumina, a benefit of mixing the granules throughout the epoxy layer 211 is that the granules improve the thermal conductivity of the entire epoxy layer as opposed to only increasing the thermal conductivity of a thin region of the epoxy layer as is the case for the configuration illustrated in FIG. 2.

Figure 7:
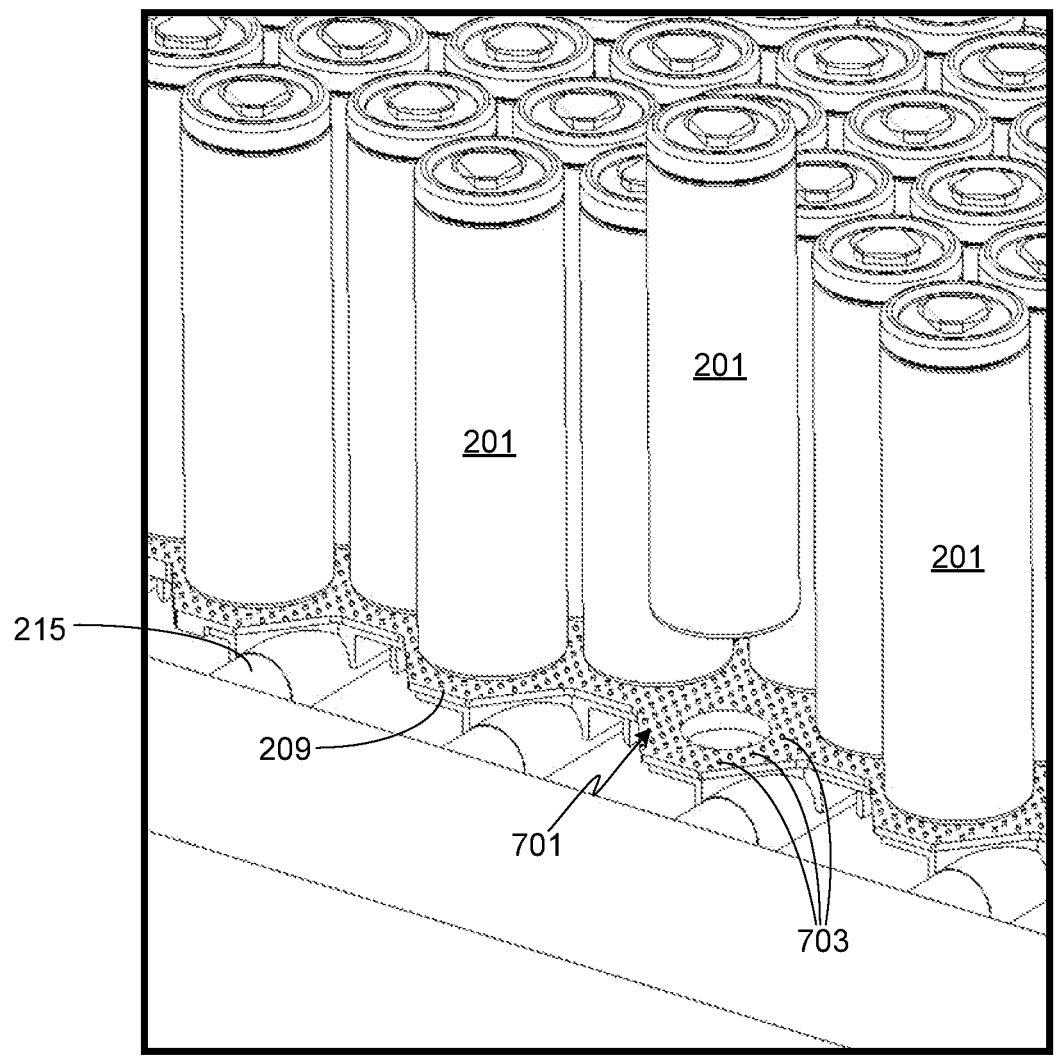
FIG. 7 provides an alternate view of a portion of the battery pack utilizing a preset pattern of epoxy/granules nubs.

If the granules 221 are confined to a relatively thin layer of epoxy layer 211, such as that illustrated in FIG. 2, it will be appreciated that there are numerous techniques that may be used to apply the thin layer of granules. For example, a layer of epoxy may first be deposited, followed by the dispersal of sufficient granules 221 to achieve the desired uniformity and distribution. Preferably the second step is performed before the epoxy deposited during the first step has cured and hardened. The rest of the epoxy used to form layer 211 may then be applied, preferably after batteries 201 have been properly positioned within the pack. Alternately and as illustrated in FIG. 7, the granules 221 may be mixed into the epoxy and pumped through an applicator to form a preset pattern 701 of epoxy/granule nubs (i.e., small protuberances) 703 on the heat sink/heat spreaders 209, thereby insuring optimal placement of the granules 221 under the batteries 201. Preferably the epoxy/granule nubs are allowed to cure before the batteries 201 are installed, after which the rest of epoxy layer 211 is applied in order to bond the batteries into the battery pack and provide the desired thermal path for transferring battery heat to the heat sink/heat spreaders 209. Typically the remaining portion of epoxy layer 211 does not include granules 221, but in at least one embodiment granules 221 are added to the remaining portion of epoxy layer 211, thereby improving thermal conductivity of the epoxy layer.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack, comprising:
a battery pack enclosure configured to house a plurality of batteries;
a heat sink/heat spreader thermally coupled to at least a subset of said plurality of batteries and thermally coupled to a thermal management system, wherein said heat sink/heat spreader is comprised of a thermally and electrically conductive material;
a layer of thermally conductive epoxy, wherein said thermally conductive epoxy is electrically insulative, wherein said layer of thermally conductive epoxy contacts and is thermally coupled to a lower portion of each battery of said subset of said plurality of batteries, wherein a region of said layer of thermally conductive epoxy is interposed between a lower surface of each battery of said subset of said plurality of batteries and an upper surface of said heat sink/heat spreader, said layer of thermally conductive epoxy having a first melting point; and
a plurality of granules dispersed throughout said region of said layer of thermally conductive epoxy, said plurality of granules comprised of a material with a second melting point, wherein said second melting point is higher than said first melting point, and wherein said plurality of granules have an average diameter in the range of 0.5 millimeters to 1.0 millimeters.

2. The battery pack of claim 1, wherein said layer of thermally conductive epoxy is comprised of an epoxy with a thermal conductivity of at least 0.75 $Wm^{-1}K^{-1}$ and a resistivity of at least $10^{12}$ ohm-cm, and wherein said layer of thermally conductive epoxy has a maximum operating temperature of at least 100° C.

3. The battery pack of claim 1, wherein said material comprising said plurality of granules has a thermal conductivity of at least 0.75 $Wm^{-1}K^{-1}$ and a resistivity of at least $10^{12}$ ohm-cm, and wherein said material comprising said plurality of granules has a melting point of at least 1000° C.

4. The battery pack of claim 3, wherein said thermal conductivity of said material comprising said plurality of granules is at least 1.0 $Wm^1K^{-1}$, wherein said resistivity of said material comprising said plurality of granules is at least $10^{12}$ ohm-cm, and wherein said material comprising said plurality of granules has a melting point of at least 1500° C.

5. The battery pack of claim 4, wherein said thermal conductivity of said material comprising said plurality of granules is at least 20.0 $Wm^{-1}K$, wherein said resistivity of said material comprising said plurality of granules is at least $10^{14}$ ohm-cm, and wherein said material comprising said plurality of granules has a melting point of at least 2000° C.

6. The battery pack of claim 1, wherein said material comprising said plurality of granules is selected from the group of materials consisting of alumina and silica.

7. The battery pack of claim 1, wherein said plurality of granules are spherically shaped.

8. The battery pack of claim 1, wherein said plurality of granules are dispersed throughout said layer of thermally conductive epoxy.

9. The battery pack of claim 8, wherein said plurality of granules are uniformly dispersed throughout said layer of thermally conductive epoxy.

10. The battery pack of claim 1, wherein said plurality of granules are dispersed in accordance with a preset dispersal pattern throughout said region of said layer of thermally conductive epoxy.

11. The battery pack of claim 10, wherein said plurality of granules dispersed in accordance with said preset dispersal pattern are comprised of a plurality of nubs, wherein each of said nubs is comprised of said thermally conductive epoxy and a portion of said plurality of granules.

12. The battery pack of claim 11, wherein said layer of thermally conductive epoxy is deposited in a multi-step process, wherein said plurality of nubs are deposited and allowed to cure prior to depositing a remainder of said layer of thermally conductive epoxy.

13. The battery pack of claim 1, further comprising a mounting tray configured to hold each of said plurality of batteries within a preset arrangement.

14. The battery pack of claim 1, wherein said upper surface of said heat sink/heat spreader is flat.

15. A battery pack of claim 1, wherein said thermally and electrically conductive material comprising said heat sink/heat spreader is comprised of a metal.

16. The battery pack of claim 1, wherein said thermally and electrically conductive material comprising said heat sink/heat spreader has a thermal conductivity of at least 100 $Wm^{-1}K^{-1}$.

17. The battery pack of claim 1, further comprising at least one cooling conduit in thermal communication with said heat sink/heat spreader, wherein integral to said cooling conduit is at least one coolant channel containing a coolant, and wherein said at least one cooling conduit is coupled to said thermal management system.

18. A battery pack, comprising:
a battery pack enclosure configured to house a plurality of batteries;
a heat sink/heat spreader thermally coupled to at least a subset of said plurality of batteries and thermally coupled to a thermal management system, wherein said heat sink/heat spreader is comprised of a thermally and electrically conductive material;
a layer of thermally conductive epoxy, wherein said thermally conductive epoxy is electrically insulative, wherein said layer of thermally conductive epoxy contacts and is thermally coupled to a lower portion of each battery of said subset of said plurality of batteries, wherein a region of said layer of thermally conductive epoxy is interposed between a lower surface of each battery of said subset of said plurality of batteries and an upper surface of said heat sink/heat spreader, said layer of thermally conductive epoxy having a first melting point; and
a plurality of granules dispersed throughout said region of said layer of thermally conductive epoxy, said plurality of granules comprised of a material with a second melting point, wherein said second melting point is higher than said first melting point, and wherein said plurality of granules have an average diameter in the range of 0.25 millimeters to 0.75 millimeters.

19. The battery pack of claim 18, wherein said layer of thermally conductive epoxy is comprised of an epoxy with a thermal conductivity of at least 0.75 $Wm^{-1}K^{-1}$ and a resistivity of at least $10^{12}$ ohm-cm, and wherein said layer of thermally conductive epoxy has a maximum operating temperature of at least 100° C.

20. The battery pack of claim 18, wherein said material comprising said plurality of granules has a thermal conductivity of at least 0.75 $Wm^{-1}K^{-1}$ and a resistivity of at least $10^{12}$ ohm-cm, and wherein said material comprising said plurality of granules has a melting point of at least 1000° C.

21. The battery pack of claim 20, wherein said thermal conductivity of said material comprising said plurality of granules is at least 1.0 $Wm^{-1}K^{-1}$, wherein said resistivity of said material comprising said plurality of granules is at least $10^{12}$ ohm-cm, and wherein said material comprising said plurality of granules has a melting point of at least 1500° C.

22. The battery pack of claim 21, wherein said thermal conductivity of said material comprising said plurality of granules is at least 20.0 $Wm^{-1}K$, wherein said resistivity of said material comprising said plurality of granules is at least $10^{14}$ ohm-cm, and wherein said material comprising said plurality of granules has a melting point of at least 2000° C.

23. The battery pack of claim 18, wherein said material comprising said plurality of granules is selected from the group of materials consisting of alumina and silica.

24. The battery pack of claim 18, wherein said plurality of granules are spherically shaped.

25. The battery pack of claim 18, wherein said plurality of granules are dispersed throughout said layer of thermally conductive epoxy.

26. The battery pack of claim 25, wherein said plurality of granules are uniformly dispersed throughout said layer of thermally conductive epoxy.

27. The battery pack of claim 18, wherein said plurality of granules are dispersed in accordance with a preset dispersal pattern throughout said region of said layer of thermally conductive epoxy.

28. The battery pack of claim 27, wherein said plurality of granules dispersed in accordance with said preset dispersal pattern are comprised of a plurality of nubs, wherein each of said nubs is comprised of said thermally conductive epoxy and a portion of said plurality of granules.

29. The battery pack of claim 28, wherein said layer of thermally conductive epoxy is deposited in a multi-step process, wherein said plurality of nubs are deposited and allowed to cure prior to depositing a remainder of said layer of thermally conductive epoxy.

30. The battery pack of claim 18, further comprising a mounting tray configured to hold each of said plurality of batteries within a preset arrangement.

31. The battery pack of claim 18, wherein said upper surface of said heat sink/heat spreader is flat.

32. The battery pack of claim 18, wherein said thermally and electrically conductive material comprising said heat sink/heat spreader is comprised of a metal.

33. The battery pack of claim 18, wherein said thermally and electrically conductive material comprising said heat sink/heat spreader has a thermal conductivity of at least 100 $Wm^1K^{-1}$.

34. The battery pack of claim 18, further comprising at least one cooling conduit in thermal communication with said heat sink/heat spreader, wherein integral to said cooling conduit is at least one coolant channel containing a coolant, and wherein said at least one cooling conduit is coupled to said thermal management system.

35. A battery pack, comprising:
a battery pack enclosure configured to house a plurality of batteries;
a heat sink/heat spreader thermally coupled to at least a subset of said plurality of batteries and thermally coupled to a thermal management system, wherein said heat sink/heat spreader is comprised of a thermally and electrically conductive material;
a layer of thermally conductive epoxy, wherein said thermally conductive epoxy is electrically insulative, wherein said layer of thermally conductive epoxy contacts and is thermally coupled to a lower portion of each battery of said subset of said plurality of batteries, wherein a region of said layer of thermally conductive epoxy is interposed between a lower surface of each battery of said subset of said plurality of batteries and an upper surface of said heat sink/heat spreader, said layer of thermally conductive epoxy having a first melting point; and
a plurality of granules dispersed throughout said region of said layer of thermally conductive epoxy, said plurality of granules comprised of a material with a second melting point, wherein said second melting point is higher than said first melting point, wherein said plurality of granules are dispersed in accordance with a preset dispersal pattern throughout said region of said layer of thermally conductive epoxy, wherein said plurality of granules dispersed in accordance with said preset dispersal pattern are comprised of a plurality of nubs, and wherein each of said nubs is comprised of said thermally conductive epoxy and a portion of said plurality of granules.

36. The battery pack of claim 35, wherein said layer of thermally conductive epoxy is comprised of an epoxy with a thermal conductivity of at least 0.75 $Wm^{-1}K^{-1}$ and a resistivity of at least $10^{12}$ ohm-cm, and wherein said layer of thermally conductive epoxy has a maximum operating temperature of at least 100° C.

37. The battery pack of claim 35, wherein said material comprising said plurality of granules has a thermal conductivity of at least 0.75 $Wm^{-1}K^{-1}$ and a resistivity of at least $10^{12}$ ohm-cm, and wherein said material comprising said plurality of granules has a melting point of at least 1000° C.

38. The battery pack of claim 37, wherein said thermal conductivity of said material comprising said plurality of granules is at least 1.0 $Wm^{-1}K^{-1}$, wherein said resistivity of said material comprising said plurality of granules is at least $10^{12}$ ohm-cm, and wherein said material comprising said plurality of granules has a melting point of at least 1500° C.

39. The battery pack of claim 38, wherein said thermal conductivity of said material comprising said plurality of granules is at least 20.0 $Wm^{-1}K$, wherein said resistivity of said material comprising said plurality of granules is at least $10^{14}$ ohm-cm, and wherein said material comprising said plurality of granules has a melting point of at least 2000° C.

40. The battery pack of claim 35, wherein said material comprising said plurality of granules is selected from the group of materials consisting of alumina and silica.

41. The battery pack of claim 35, wherein said plurality of granules are spherically shaped.

42. The battery pack of claim 35, wherein said layer of thermally conductive epoxy is deposited in a multi-step process, wherein said plurality of nubs are deposited and allowed to cure prior to depositing a remainder of said layer of thermally conductive epoxy.

43. The battery pack of claim 35, further comprising a mounting tray configured to hold each of said plurality of batteries within a preset arrangement.

44. The battery pack of claim 35, wherein said upper surface of said heat sink/heat spreader is flat.

45. The battery pack of claim 35, wherein said thermally and electrically conductive material comprising said heat sink/heat spreader is comprised of a metal.

46. The battery pack of claim 35, wherein said thermally and electrically conductive material comprising said heat sink/heat spreader has a thermal conductivity of at least 100 $Wm^{-1}K^{-1}$.

47. The battery pack of claim 35, further comprising at least one cooling conduit in thermal communication with said heat sink/heat spreader, wherein integral to said cooling conduit is at least one coolant channel containing a coolant, and wherein said at least one cooling conduit is coupled to said thermal management system.

* * * * *